US011509524B2

(12) United States Patent
Barabell

(10) Patent No.: US 11,509,524 B2
(45) Date of Patent: Nov. 22, 2022

(54) FLEXIBLE INTERFACE BETWEEN A BASEBAND CONTROLLER AND REMOTE UNITS OF A C-RAN

(71) Applicant: CommScope Technologies LLC, Hickory, NC (US)

(72) Inventor: Arthur J. Barabell, Sudbury, MA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/810,424

(22) Filed: Mar. 5, 2020

(65) Prior Publication Data
US 2020/0287785 A1  Sep. 10, 2020

Related U.S. Application Data

(60) Provisional application No. 62/814,606, filed on Mar. 6, 2019.

(51) Int. Cl.
*H04L 41/0806* (2022.01)
*H04L 41/12* (2022.01)
*H04L 25/02* (2006.01)

(52) U.S. Cl.
CPC .......... *H04L 41/0806* (2013.01); *H04L 25/02* (2013.01); *H04L 41/12* (2013.01)

(58) Field of Classification Search
CPC ...... H04L 41/0806; H04L 25/02; H04L 41/12
See application file for complete search history.

(56) References Cited

U.S. PATENT DOCUMENTS 9,380,466 B2  6/2016  Eyuboglu et al.
9,414,399 B2  8/2016  Eyuboglu et al.
(Continued)

FOREIGN PATENT DOCUMENTS

EP  3226496 A1  10/2017
WO  2016145371 A2  9/2016
(Continued)

OTHER PUBLICATIONS

International Searching Authority, "International Search Report and Written Opinion from PCT Application No. PCT/US2020/021196", from Foreign Counterpart to U.S. Appl. No. 16/810,424, dated Jul. 2, 2020, pp. 1 through 11, Published: WO.
(Continued)

*Primary Examiner* — Duc C Ho
(74) *Attorney, Agent, or Firm* — Fogg & Powers LLC

(57) ABSTRACT

In one embodiment, a method comprises determining which functional splits between processing performed in a baseband controller and processing performed in a remote unit are supported by each remote unit served by the baseband controller. The method further comprises determining at least one functional split in the processing performed in the baseband controller and the processing performed in the remote units to use. The method further comprises, for each said at least one functional split and each remote unit associated with that functional split, configuring the processing performed in the baseband controller and the processing performed in that remote unit are configured to use that functional split and configuring a respective interface between the baseband controller and that remote unit are configured for communicating front-haul data therebetween using that functional split.

34 Claims, 2 Drawing Sheets

(56) References Cited

U.S. PATENT DOCUMENTS

Figure 1:
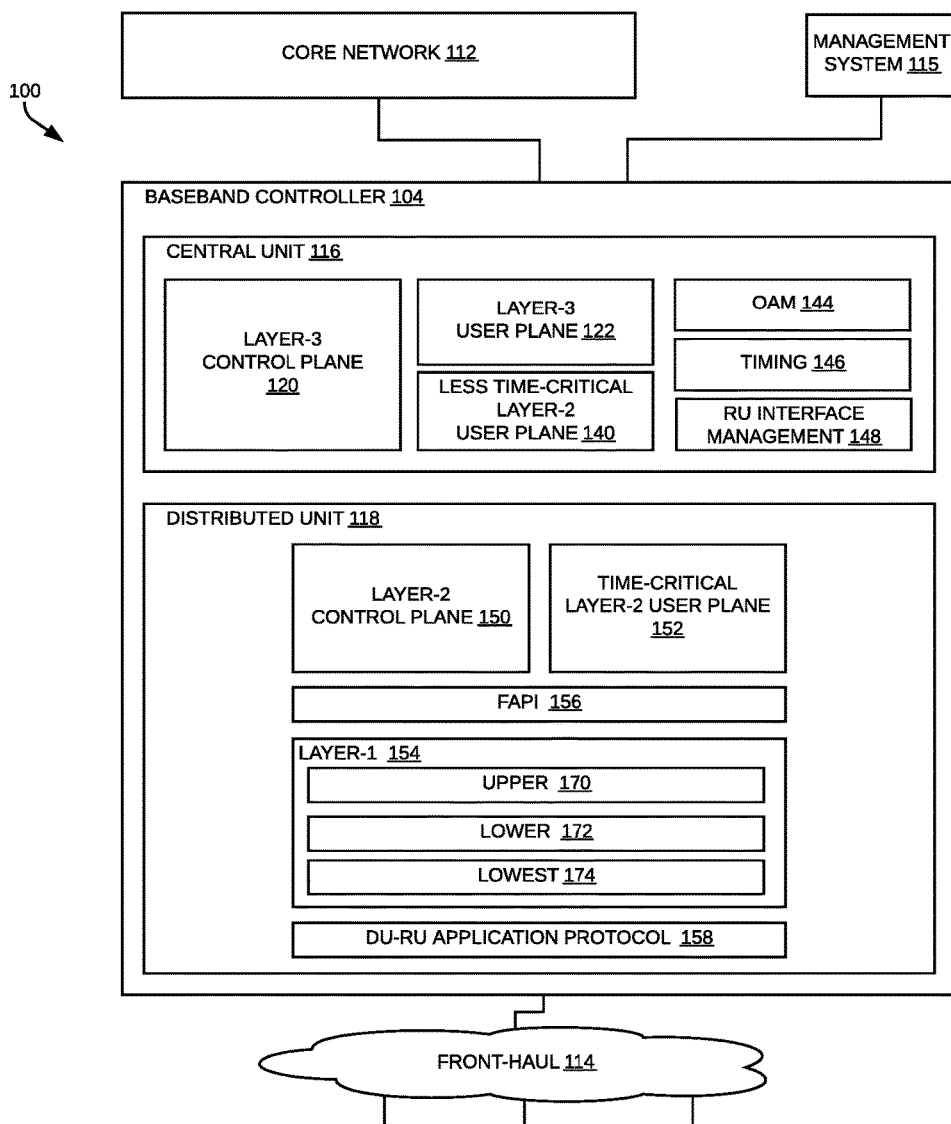
Figure 1:
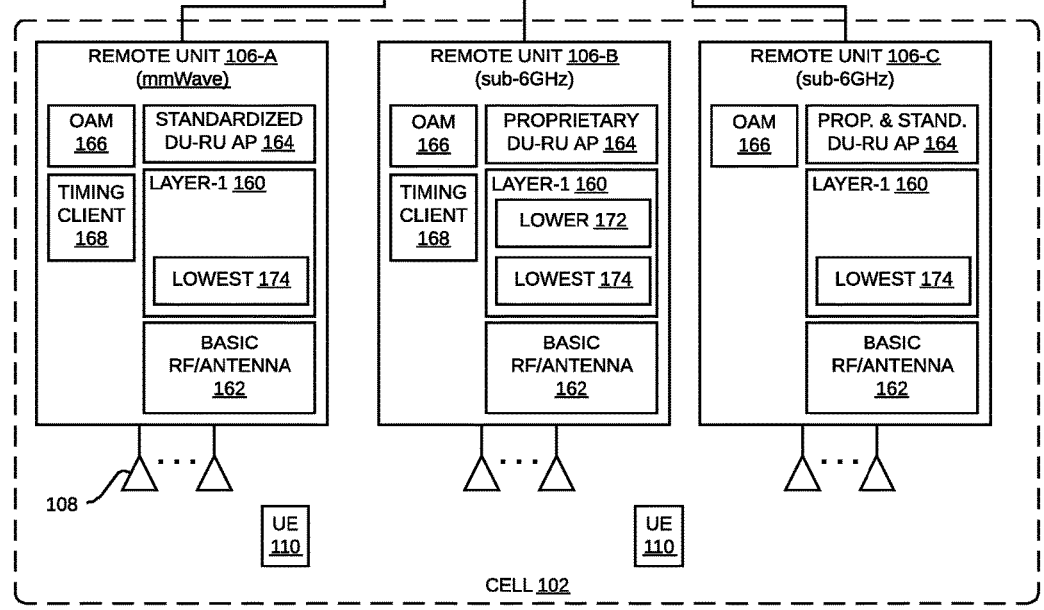

| | | | |
|---|---|---|---|
| 9,936,470 | B2 | 4/2018 | Eyuboglu et al. |
| 9,998,310 | B2 | 6/2018 | Barbieri et al. |
| 10,019,391 | B2 | 7/2018 | Accapadi et al. |
| 10,057,916 | B2 | 8/2018 | Barabell et al. |
| 10,097,391 | B2 | 10/2018 | Fertonani et al. |
| 10,244,507 | B2 | 3/2019 | Tarlazzi et al. |
| 10,355,895 | B2 | 7/2019 | Barbieri et al. |
| 2017/0373890 | A1 | 12/2017 | Fertonani et al. |
| 2018/0159611 | A1 | 6/2018 | Majmundar et al. |
| 2018/0176898 | A1* | 6/2018 | Yu ................... H04W 88/085 |
| 2018/0227028 | A1 | 8/2018 | Lee |
| 2018/0242349 | A1* | 8/2018 | Noh ................... H04L 69/22 |
| 2018/0287696 | A1 | 10/2018 | Barbieri et al. |
| 2018/0376489 | A1 | 12/2018 | Andrews et al. |
| 2019/0007246 | A1 | 1/2019 | Fertonani et al. |
| 2019/0116568 | A1 | 4/2019 | Fertonani et al. |
| 2019/0208575 | A1 | 7/2019 | Barbieri et al. |
| 2019/0341970 | A1 | 11/2019 | Lange |
| 2020/0092154 | A1 | 3/2020 | Kwon et al. |
| 2020/0092229 | A1 | 3/2020 | Levi et al. |
| 2020/0137549 | A1 | 4/2020 | Barabell et al. |

FOREIGN PATENT DOCUMENTS

| | | |
|---|---|---|
| WO | 2017070635 A1 | 4/2017 |
| WO | 2018017468 A1 | 1/2018 |

OTHER PUBLICATIONS

Haberland et al., "Base Stations in the Cloud", Alcatel-Lucent, Sep. 28, 2012, pp. 1-23, www.alcatel-lucent.com.

Zhu et al., "Virtual Base Station Pool: Towards a Wireless Network Cloud for Radio Access Networks", May 2010, pp. 1-10, ACM.

International Searching Authority, "International Search Report and Written Opinion from PCT Application No. PCT/US2021/039614", from Foreign Counterpart to U.S. Appl. No. 17/362,344, dated Oct. 13, 2021, pp. 1 through 9, Published: WO.

U.S. Patent and Trademark Office, "Notice of Allowance", U.S. Appl. No. 17/362,344, dated Sep. 2, 2022, pp. 1 through 39, Published: US.

* cited by examiner

FLEXIBLE INTERFACE BETWEEN A BASEBAND CONTROLLER AND REMOTE UNITS OF A C-RAN

CROSS-REFERENCE TO RELATED APPLICATION

This application claims the benefit of U.S. Provisional Patent Application Ser. No. 62/814,606, filed on Mar. 6, 2019, which is hereby incorporated herein by reference in its entirety.

BACKGROUND

A centralized radio access network (C-RAN) can be used to implement base station functionality for providing wireless service to various items of user equipment (UE). Typically, for each cell implemented by the C-RAN, one or more baseband units (BBUs) (also referred to here as "baseband controllers" or simply "controllers") interact with multiple remote units. Each baseband controller is coupled to the remote units over front-haul communication links or a front-haul network.

Historically, data for the wireless interface was communicated between the baseband controller and the remote units over the front-haul as time-domain in-phase and quadrature (I/Q) data (for example, using a front-haul and data that complies with the Common Public Radio Interface (CPRI) specification). When this is done, the processing for the wireless interface is "split" so that the baseband controller would perform all digital baseband processing for Layer-1 of the wireless interface, while the remote units would perform the basic radio frequency (RF) functions such as digital up-conversion (DUC) and digital-to-analog (D/A) conversion (in the downlink) and digital down-conversion (DDC) and analog-to-digital (A/D) conversion (in the uplink), and analog functions (for example, any analog frequency conversion, filtering, and amplification).

However, using the functional split between the baseband controller and remote unit noted above results in data being communicated between the baseband controller and the remote units as time-domain I/Q data, which requires a relatively high amount of bandwidth and low-latency from the front-haul.

While other functional splits between the baseband controller and the remote units have been proposed and used, the functional split is typically fixed. That is, the baseband controller and remote units are all designed to use single functional split.

SUMMARY

One embodiment is directed to a system comprising a baseband controller to communicatively couple the system to a core network and a plurality of remote units, communicatively coupled to the baseband controller, to wirelessly transmit and receive radio frequency signals to and from user equipment using a wireless interface. Each of the remote units is associated with at least one antenna and located remote from the controller. The system is configured to: determine what functional splits between processing performed in the baseband controller and processing performed in the remote units that each remote unit supports; determine at least one functional split in the processing performed in the baseband controller and the processing performed in the remote units to use; and, for each said at least one functional split and each remote antenna unit associated with that functional split: configure the processing performed in the baseband controller and the processing performed in that remote unit to use that functional split; and configure a respective interface between the baseband controller and that remote unit for communicating front-haul data therebetween using that functional split.

Another embodiment is directed to a method for use with a system comprising a baseband controller communicatively coupled to a core network and a plurality of remote units. The remote units are configured to wirelessly transmit and receive radio frequency signals to and from user equipment using a wireless interface. Each of the remote units is associated with at least one antenna and located remote from the controller. The method comprises determining what functional splits between processing performed in the baseband controller and processing performed in the remote units that each remote unit supports; determining at least one functional split in the processing performed in the baseband controller and the processing performed in the remote units to use; and, for each said at least one functional split and each remote unit associated with that functional split: configuring the processing performed in the baseband controller and the processing performed in that remote unit to use that functional split; and configuring a respective interface between the baseband controller and that remote unit for communicating front-haul data therebetween using that functional split.

Other embodiments are disclosed.

The details of various embodiments are set forth in the accompanying drawings and the description below. Other features and advantages will become apparent from the description, the drawings, and the claims.

DRAWINGS

FIG. 1 is a block diagram illustrating one exemplary embodiment of a centralized radio access network (C-RAN).

Figure 2:
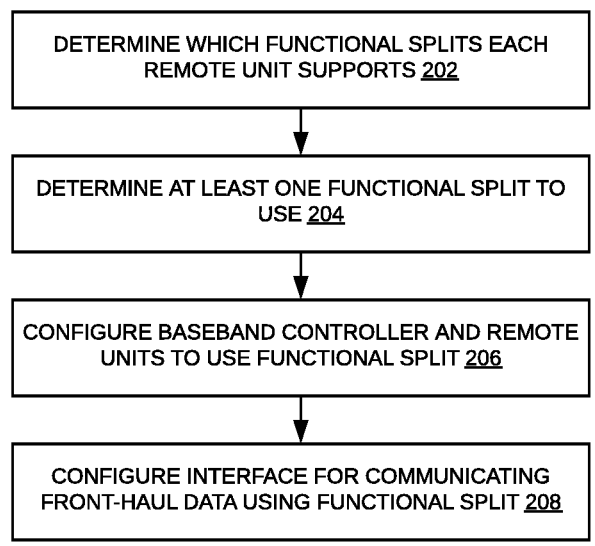

FIG. 2 comprises a high-level flowchart illustrating one exemplary embodiment of a method 200 of configuring an interface between a baseband controller and at least one remote unit of a C-RAN.

Like reference numbers and designations in the various drawings indicate like elements.

DETAILED DESCRIPTION

FIG. 1 is a block diagram illustrating one exemplary embodiment of a centralized radio access network (C-RAN) 100.

The C-RAN 100 (also referred to here as a "C-RAN system" 100 or just "system" 100) shown in FIG. 1 comprises, for each cell 102 served by the C-RAN 100, a baseband controller 104 and multiple remote units (RUs) 106. Each remote unit 106 is remotely located from the baseband unit 104. Also, in this exemplary embodiment, at least one of the remote units 106 is remotely located from at least one other remote unit 106. Each remote unit 106 includes or is coupled to one or more antennas 108 via which downlink RF signals are radiated to various items of user equipment (UE) 110 and via which uplink RF signals transmitted by UEs 110 are received.

The system 100 is coupled to a core network 112 of the associated wireless network operator over an appropriate back-haul. Also, each baseband controller 104 is communicatively coupled to the remote units 106 served by it using a front-haul network 114. The baseband controllers 104 and the remote units 106 include one or more network interfaces (not shown) in order to enable the baseband controllers 104 and remote units 106 to communicate over the front-haul network 114.

In one implementation, the front-haul 114 that communicatively couples each baseband controller 104 to the remote units 106 is implemented using a switched ETHERNET network. In such an implementation, each baseband controller 104 and remote unit 106 includes one or more ETHERNET interfaces for communicating over the switched ETHERNET network used for the front-haul 114. However, it is to be understood that the front-haul between each baseband controller 104 and the remote units 106 served by it can be implemented in other ways.

In the exemplary embodiment shown in FIG. 1, a management system 115 is communicatively coupled to the controllers 104 and remote units 106, for example, via the Internet (or another network used to implement the back-haul to the core network 112 and an Ethernet network (for example, an Ethernet network used to implement the front-haul network 114). Also, in some implementations, the management system 115 sends and receives management communications to and from the controllers 104, each of which in turn forwards relevant management communications to and from the remote units 106.

Generally, for each cell 102 implemented by the C-RAN 100, the corresponding based controller 104 serving the cell 102 performs the LAYER-3 and LAYER-2 functions for the particular wireless interface used for that cell 102. Also, for each cell 102 implemented by the C-RAN 100, the corresponding based controller 104 serving the cell 102 performs some of the LAYER-1 functions for the particular wireless interface used for that cell 102. Each of the remote units 106 serving that cell 102 perform the LAYER-1 functions not performed by the baseband controller 104 as well as implementing the basic RF functions.

In the particular embodiment shown in FIG. 1, the C-RAN 100 is configured to use one or more Fifth Generation (5G) wireless interfaces and associated protocols. However, it is to be understood that other embodiments can be implemented in other ways—for example, the C-RAN 100 can be configured to use other wireless interfaces and protocols such as the Long-Term Evolution (LTE) wireless interfaces and protocols and/or to support multiple wireless interfaces and protocols.

In the exemplary embodiment shown in FIG. 1, the functions of the baseband controller 104 are partitioned into a Central Unit (CU) 116 and a Distributed Unit (DU) 118 consistent with the architecture defined in the 5G standards.

In this embodiment, the CU 116 implements the Layer-3 Control Plane functions 120 and the Layer-3 User Plane functions 122 for the wireless interface. In this exemplary embodiment, the Layer-3 Control Plane functions 120 include Stream Control Transmission Protocol (SCTP) functions, S1 Application Protocol (S1-AP) functions for communicating with the core network 112 (which in this example comprises an Evolved Packet Core (EPC) core network), and X2 Application Protocol (X2-AP) functions for communicating with other base stations. The Layer-3 Control Plane functions 120 also include Radio Resource Management (RRM) functions, Self-Organizing Network (SON) functions, Radio Environment Map (REM) functions, and Radio Resource Control (RRC) functions.

In this exemplary embodiment, the Layer-3 User Plane functions 122 include evolved General Packet Radio Service (GPRS) Tunneling Protocol (eGTP) functions.

In this exemplary embodiment, the CU 116 also implements less time critical Layer-2 User Plane functions 140 for the wireless interface. The less time-critical Layer-2 User Plane functions 140 implemented in the CU 116 include Packet Data Convergence Protocol (PDCP) functions.

In this exemplary embodiment, the CU 116 also implements various management and configuration functions—including Operation, Administration, and Management (OAM) functions 144 for managing the baseband controller 104 and communicating with the management system 115 and a timing subsystem 146 configured to synchronize the local clocks of other nodes in the C-RAN 100 to a master clock. In the embodiment shown in FIG. 1, the timing subsystem 146 is configured to use the Precision Time Protocol (PTP) to do this.

The various management and configuration functions implemented by the CU 116 also comprise remote unit interface management functions 148 that are configured to discover what functional splits and associated interfaces the various remote units 106 support, decide which split and associated interface to use, configure the Layer-1 functions in the baseband controller 104 and remote units 106 to use the selected split and interface, and configure the DU-RU application layer protocols in the baseband controller 104 and remote units 106 accordingly.

In this embodiment, the DU 118 implements the Layer-2 Control Plane functions 150 for the wireless interface as well as time-critical Layer-2 User Plane functions 152 for the wireless interface. The Layer-2 Control Plane functions 150, in this example, include a MAC scheduler ecosystem. The time-critical Layer-2 User Plane functions 152, in this example, include Radio Link Control (RLC) functions and MAC functions.

The DU 118 also implements some of the Layer-1 functions 154 for the wireless interface as well as Femto Application Platform Interface (FAPI) functions 156 that provide an interface between the Layer-2 functions 150 and 152 and Layer-1 functions 154. The DU 118 also implements DU-RU Application Protocol functions 158 that provide an interface between the DU 118 and the remote units 106.

Each remote unit 106 implements the Layer-1 functions 160 for the wireless interface that are not implemented in the DU 118. Each RU 106 also implements the basic RF and antenna functions 162 for the wireless interface. In the exemplary embodiment shown in FIG. 1, the basic RF and antenna functions 162 include digital up-conversion (DUC) for the downlink and digital down-conversion (DDC) for the uplink, digital-to-analog conversion for the downlink and analog-to-digital conversion for the uplink and analog frequency conversion (implemented in a RF integrated circuit (RFIC) in this example), a power amplifiers (PA) for the downlink and a low-noise amplifier (LNA) for the uplink, and any beam steering functions.

Each remote unit 106 also implements DU-RU Application Protocol functions 164 that provide an interface between the DU 118 and the remote units 106. Each remote unit 106 also includes Operation, Administration, and Management (OAM) functions 166 for managing that remote unit 106 and communicating with the management system 115 and the OAM functions 144 in the serving baseband controller 104. In the exemplary embodiment shown in FIG. 1, some of the remote units 106 also implement a timing client 168 configured to synchronize the clock of the remote unit 106 to the master clock used for in the C-RAN 100. In the embodiment shown in FIG. 1, the timing client 168 is configured to use the PTP to do this.

The 3GPP has promulgated 5G specifications identifying various options for a functional split processing between the processing performed in the baseband controller and the processing performed in the remote units. In the embodiments described here, the baseband controller 104 is configured to support various functional splits including Option 7 (where the functional split occurs at various places within the Layer-1 digital baseband processing chain) and Option 8 (where the functional split occurs at the interface between the Layer-1 digital baseband processing chain and the basic RF functions).

In order to support the various intra-Layer-1 functional splits (that is, the various Option 7 splits), the Layer-1 functions 154 and 160 are partitioned into upper Layer-1 functions 170, lower Layer-1 functions 172, and lowest Layer-1 functions 172. In this example, the upper Layer-1 functions 170 comprise coding, rate matching, scrambling, modulation, layer mapping, and precoding in the downlink and channel estimation, diversity combining, equalization, de-modulation, de-scrambling, rate matching, and decoding in the uplink. The lower functions 172, in this example, comprise resource element mapping and beamforming port expansion in the downlink and port reduction and resource element de-mapping in the uplink. The lowest functions 174, in this example, comprise the inverse Fast Fourier Transform (iFFT) and Cyclic Prefix (CP) insertion in the downlink and CP removal and the Fast Fourier Transform (FFT) in the uplink.

In one example, the C-RAN 100 is configured to provide 5G wireless service using one or more millimeter wave (mmWave) RF carriers. In such a configuration, relatively higher throughput will typically be provided via the wireless interface and, as a result, it may only be possible to perform the lowest Layer-1 functions 174 in the remote units 106. As a consequence, in such a configuration, the functional split between the baseband controller 104 and the remote units 106 would need to occur between the lower Layer-1 functions 172 and the lowest Layer-1 functions 174, with the upper and lower Layer-1 functions 170 and 172 being performed in the baseband controller 104 and only the lowest Layer-1 functions 174 being performed in the remote units 106. In FIG. 1, one of the remote units 106 (individually referenced in FIG. 1 as "remote unit 106-A") is shown as being configured to use this functional split between the baseband controller 104 and the remote units 106.

In another example, the C-RAN 100 is configured to provide 5G wireless service using the sub-6 Gigahertz (GHz) (for example, using Citizens Broadband Radio Service (CBRS) shared spectrum or re-farmed LTE spectrum). Such a configuration may not have the same throughput as the mmWave configuration and, as a result, it may be possible to perform both the lower and lowest Layer-1 functions 172 and 174 for the wireless interface in the remote units 106. As a consequence, in such a configuration, the functional split between the baseband controller 104 and the remote units 106 can occur between the upper Layer-1 functions 170 and the lower Layer-1 functions 172, with only the upper Layer-1 functions 170 being performed in the baseband controller 104 and both the lower and lowest Layer-1 functions 172 and 174 being performed in the remote units 106. Doing so can reduce the demands on the front-haul network 114 since the data communicated between the baseband controller 104 and the remote units 106 over the front-haul network 114 in this configuration can be communicated in a more bandwidth-efficient format using this functional split than in the mmWave configuration. In FIG. 1, one of the remote units 106 (individually referenced in FIG. 1 as "remote unit 106-B") is shown as being configured to use this functional split between the baseband controller 104 and the remote units 106.

The DU-RU Application Protocol functions 164 can be configured to support one or more interfaces between the baseband controller 104 and the remote units 106 including, for example, a proprietary interface and/or a standardized interface. In the example shown in FIG. 1, the DU-RU Application Protocol functions 164 in a first one of the remote units 106 (individually referenced in FIG. 1 as remote unit 106-A) supports only a standardized interface between the baseband controller 104 and that remote unit 106, a second one of the remote units 106 (individually referenced in FIG. 1 as remote unit 106-B) supports only a proprietary interface between the baseband controller 104 and that remote unit 106, and a third one of the remote units 106 (individually referenced in FIG. 1 as remote unit 106-C) supports both a proprietary interface and a standardized interface between the baseband controller 104 and that remote unit 106.

FIG. 2 comprises a high-level flowchart illustrating one exemplary embodiment of a method 200 of configuring an interface between a baseband controller and at least one remote unit of a C-RAN. The embodiment of method 200 shown in FIG. 2 is described here as being implemented by the baseband controller 104 (for example, in the remote unit interface management functions 148) for use in the C-RAN 100 described above in connection with FIG. 1, though it is to be understood that other embodiments can be implemented in other ways. For example, the processing associated with method 200 can also be implemented (at least in part) in another node that is a part of the C-RAN 100 or external to the C-RAN 100 (for example, by the management system 115 or one of the remote units 106).

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner). Also, most standard exception handling is not described for ease of explanation; however, it is to be understood that method 200 can and typically would include such exception handling.

Method 200 can be performed, for example, whenever the configuration of the C-RAN 100 changes (for example, when the C-RAN 100 is powered on and whenever a new baseband controller 104 or remote unit 106 is added to the C-RAN 100 or restarted). Method 200 can also be performed in response to other events (for example, in response to a significant change in the front-haul bandwidth or latency or a significant change in a key performance indicator associated with the cell 102).

Method 200 comprises determining which functional splits between the baseband controller 104 and the remote unit 106 each remote unit 106 supports (block 202).

One way the baseband controller 104 can be configured to do this is by using a discovery protocol and process. For example, in some embodiments, the baseband controllers 104 and remote units 106 are configured to use a discovery protocol and process in order to discover baseband controllers 104 and remote units 106 and to home the remote units 106 to a serving baseband controller 104. In these embodiments, the discovery process comprises each remote unit 106 sending discovery messages for reception by any baseband controllers 104 in the C-RAN 100 via the front-haul 114. The discovery messages announce the presence of that remote unit 106. Each baseband controller 104 that is serving a particular cell 102 can be configured with a list of remote units 106 that have been assigned to that cell 102. This list is also referred to here as the "whitelist." When the baseband controller 104 serving a particular cell 102 receives a discovery message from a remote unit 106 that is included on the whitelist for the cell 102, the baseband controller 104 sends a discovery response message to that remote unit 106 indicating that the remote unit 106 should be homed to that baseband controller 104. Each remote unit 106 can be configured to include in the discovery messages it sends as a part of this discovery process information identifying which functional splits that the remote unit 106 supports. Then, the baseband controller 104 can use this information included in such discovery messages to determine which functional splits all the remote units 106 assigned to that cell 102 support by collecting such information from the discovery messages it receives from the remote units 106 it serves.

In other embodiments, other discovery protocols and processes can be used (for example, a discovery process that is used only for discovering which functional splits the remote units 106 support).

Another way that the baseband controller 104 can be configured to determine the supported functional splits for each remote unit 106 is to receive this information from the management system 115. The management system 115 can be used to manually enter this information and communicated to it. For example, the management system 115 can be used to enter this information into the whitelist for the cell 102 (which as noted above identifies the remote units 106 assigned to the cell 102). In this way, the baseband controller 104 can be explicitly configured so that it has information about which functional splits the remote units 106 assigned to the cell 102 support.

Another way that the baseband controller 104 determine the supported functional splits for each remote unit 106 is to include a look-up table in the baseband controller 104 that contains information identifying the functional splits supported by the various makes and models of remotes units 106 that could possibly be used with the baseband controller 104. Then, to determine the supported functional splits for a given remote unit 104, the baseband controller 104 determines the make and model of each remote unit 106 assigned to the cell 102 via the discovery process described above or by having the make and model of each remote unit 106 manually entered into the whitelist for the cell 102.

A combination of approaches for determining which functional splits the remote units 106 support can also be used. For example, one approach (for example, one that uses a discovery process) can be used with remote units 106 that are supplied by the same manufacturer as the baseband controller 104, and another approach (for example, one that uses the management system 115 to explicitly configure the baseband controller 104 with such information) can be used with remote units 106 that are supplied by a manufacturer other than the one that supplies the baseband controller 104.

Other approaches can also be used.

Method 200 further comprises determining at least one functional split to use for communicating between the baseband controller 104 and the remote units 106 over the front-haul network 114 (block 204).

In the exemplary embodiment described here in connection with FIG. 2, a single functional split is used for all remote units 106 assigned to a given cell.

In one example, the baseband controller 104 identifies a functional split that all of the remote units 106 support. If there is no functional split that all of the remote units 106 support, then an error can be signaled (for example, via the management system 115). If there is only one functional split that all of the remote units 106 support, then that functional split is used. If there are multiple functional splits that all of the remote units 106 support, then a functional split can be selected based on a number of factors. For example, such factors can include how the C-RAN 100 will be configured to provide wireless service to the cell 102 (for example, whether a mmWave configuration or a sub-6 GHz configuration will be used and what 5G Numerology configuration is used) and information related to the front-haul network 114 (for example, the bandwidth and latency that can be provided by the front-haul network 114). How the C-RAN 100 will be configured to provide wireless service to the cell 102 determines the Layer-1 processing constraints that apply to the remote units 106 as well as bandwidth and latency requirements for the front-haul network 114. Any functional splits that are not able to satisfy the Layer-1 processing constraints for the desired C-RAN configuration are eliminated from further consideration. Then each of the remaining functional splits can be evaluated to determine if the bandwidth and latency requirements associated with using that functional split with the desired C-RAN configuration can be satisfied by the front-haul network 114, and, if that is not the case, then that functional split is eliminated from further consideration. Then, a functional split to be used is selected from the remaining functional splits (for example, using a ranking scheme). Again, if no functional split is able to satisfy all constraints, an error can be signaled (for example, via the management system 115).

In other embodiments, the functional split that is used for communicating between the baseband controller 104 and the remote units 106 over the front-haul network 114 is determined in other ways.

Moreover, in other embodiments, instead of using a single functional split for all remote units assigned to the cell 102, different functional splits are used for different remote units 106 or groups of remote units 106 assigned to the cell 102.

Method 200 further comprises, for each functional split to be used and each remote associated with that functional split, configuring the processing performed in the baseband controller 104 and the processing performed in that remote unit 106 to use that functional split (block 206).

In the exemplary embodiment described here in connection with FIG. 2 where a single functional split is used for all remote units assigned to the cell 102, configuring the processing performed in the baseband controller 104 and the processing performed in the remote units 106 to use the single selected functional split involves configuring the Layer-1 functions 154 and 160 in the baseband controller 104 and the remote units 106, respectively, to use the single functional split selected for use with the cell 102. In this exemplary embodiment, the remote unit interface management functions 148 in the baseband controller 104 configures the Layer-1 functions 154 in the baseband controller 104 to use the selected functional split and sends configuration messages (for example, over a management virtual local area network (VLAN) provided over the front-haul network 114 for communicating management data) to the remote units 106 instructing the remote units 106 to use the selected functional split. In response to receiving such configuration messages, the remote units 106 configure the Layer-1 functions 160 in them to use the selected functional split indicated in the configuration message.

The Layer-1 functionality 154 and 160 in the baseband controllers 104 and the remote units 106 can be configured to support different functional splits in various ways.

One way in which the Layer-1 functionality 154 and 160 can be configured to support different functional splits is to use a "brute force" approach in which completely separate processing chains are provided for each of the different functional splits the Layer-1 functionality 154 and 160 support.

Another way is to provide functional split options on a per air-interface channel (for example, Physical Uplink Shared Channel (PUSCH), Physical Random Access Channel (PRACH), etc.) basis. The functional split options could then be selected by the controller 104 according to the overall interface needs. This approach is likely to be more extensible and require a smaller software footprint.

Another way in which the Layer-1 functionality 154 and 160 can be configured to support different functional splits is to make use of "stackable" or "configurable" processing chains in which various stages of the processing chain can be omitted if those stages are performed in the "other" unit (that is, the remote unit 106, in the case of the baseband controller 104, or the baseband controller 104, in the case of the remote unit 106).

Moreover, the approach used in the baseband controller 104 can differ from the approach used in the remote units 106, and all remote units 106 need not use the same approach.

Method 200 further comprises, for each functional split to be used and each remote unit 106 associated with that functional split, configuring a respective interface between the baseband controller 104 and that remote unit 106 for communicating front-haul data therebetween using that functional split (block 208).

In this exemplary embodiment, this involves configuring the application layer protocol to use an appropriate baseband controller/RU interface and to support communicating data in a format suitable for the selected functional split. This can be done in conjunction with configuring the Layer-1 functions 154 and 160 in the baseband controller 104 and the remote units 106, respectively, to use the selected functional split as described above in connection with block 206.

In the embodiment shown in FIG. 2, the baseband controller 104 is configured to work with remote units 106 that support different baseband controller/RU interfaces for communications between the baseband controller 104 and remote units 106—including one or more proprietary interfaces and one or more standardized interfaces (such as the standardized interfaces promulgated by the extensible Radio Access Network (xRAN) Forum or by the IEEE 1914 working group). The remote unit interface management functions 148 in the baseband controller 104 configures the DU-RU Application Protocol functions 158 in the baseband controller 104 to use the appropriate baseband controller/RU interface for each remote unit 106 served by the baseband controller 106 and to configure the selected baseband controller/RU interface for use with the selected functional split. Also, each remote unit 106 configures the DU-RU Application Protocol functions 164 to use the appropriate baseband controller/RU interface and to configure that baseband controller/RU interface for use with the selected functional split.

After configuring the Layer-1 functions 154 and 160 and the DU-RU Application Protocol functions 158 and 164 in the baseband controller 104 and the remote units 106, respectively, to use the selected functional split and an appropriate controller/RU interface, the baseband controller 104 and remote units 106 use the selected functional split and controller/RU interface for front-hauling data between the baseband controller 104 and the remote units 106 and to provide wireless service to the UEs 110.

By using a flexible functional split and controller/RU interface, a single version of a baseband controller 104 can work with a variety of remote units 106 in a variety of environments to support a variety of wireless-interface configurations. Thus, a supplier of the baseband controller 104 does not need create and support different versions of the baseband controller 104 for each different type of remote unit 106, environment, or wireless interface configuration. Also, wireless operators will be able to use such a baseband controller 104 in variety of usage scenarios, which is more convenient and economical for the operator.

In the exemplary embodiment described above in connection with FIG. 2, the baseband controller 104 is described as using a single functional split for all of the remote units 106 served by the baseband controller 104. However, other embodiments can be implemented in other ways. For example, the baseband controller 104 can be configured to select and configure a different functional split for different networking slices, different groups of remote units 106 used with a given cell 102 or networking slice, or even on per-remote-unit basis. In such an embodiment, a high capacity broadband controller 104 implemented using a virtualized platform can be used. A separate instance of the baseband controller functionality of portions thereof (such as the DU 118) can be instantiated for each networking slice served by the baseband controller 104. In such an embodiment, the baseband controller 104 can be configured to select and configure a different functional split for each networking slice served by the baseband controller 104 since each networking slice is being served by a separate instance running in the virtualized environment and can independently use a process like the one described above in connection with FIG. 2 to select and configure a functional split and controller/RU interface to use with that networking slice.

Moreover, in the exemplary embodiment described above in connection with FIG. 2, the baseband controller 104 is described as performing the processing of method 200. However, other embodiments can be implemented in other ways. For example, a node or entity other than the baseband controller 104 (for example, a management entity such as the management system 115 or an entity running on one of the remote units 106) can perform such processing.

Other embodiments can be implemented in other ways.

Each baseband controller, remote unit, and management system described above (and the various functions described as being included therein), as well as the system more generally, and any of the specific features described here as being implemented by any of the foregoing, can also be referred to as "circuitry" or a "circuit" that implements that element, function, system, or feature (for example, circuitry or a circuit included in special-purpose hardware, general-purpose hardware, and/or a virtual platform).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

Example Embodiments

Example 1 includes a system comprising: a baseband controller to communicatively couple the system to a core network; and a plurality of remote units, communicatively coupled to the baseband controller, to wirelessly transmit and receive radio frequency signals to and from user equipment using a wireless interface, each of the remote units associated with at least one antenna and located remote from the controller; wherein the system is configured to: determine what functional splits between processing performed in the baseband controller and processing performed in the remote units that each remote unit supports; determine at least one functional split in the processing performed in the baseband controller and the processing performed in the remote units to use; and for each said at least one functional split and each remote antenna unit associated with that functional split: configure the processing performed in the baseband controller and the processing performed in that remote unit to use that functional split; and configure a respective interface between the baseband controller and that remote unit for communicating front-haul data therebetween using that functional split.

Example 2 includes the system of Example 1, wherein the baseband controller is partitioned into a Central Unit and a Distributed Unit.

Example 3 includes the system of any of Examples 1-2, wherein the system is configured to determine what functional splits between the processing performed in the baseband controller and the processing performed in the remote units that each remote unit supports by doing at least one of: using a discovery protocol; and explicitly configuring the system with information identifying what functional splits between the processing performed in the baseband controller and the processing performed in the remote units that each remote unit supports.

Example 4 includes the system of Example 3, wherein the discovery protocol comprises at least one of: a discovery protocol used to home the remote units to the baseband controller; and a dedicated discovery protocol used only to determine what functional splits between the processing performed in the baseband controller and the processing performed in the remote units that each remote unit supports.

Example 5 includes the system of any of Examples 3-5, wherein the system is explicitly configured with information identifying what functional splits between the processing performed in the baseband controller and the processing performed in the remote units that each remote unit supports using a management system.

Example 6 includes the system of any of Examples 3-5, wherein the information identifying what functional splits between the processing performed in the baseband controller and the processing performed in the remote units that each remote unit supports is, at least one of: included in a list identifying each remote unit assigned to a cell served by the baseband controller; and a look-up table that includes information about functional splits various makes and models of remote unit support, wherein the makes and models of the plurality of remote units are used to determine what functional splits between the processing performed in the baseband controller and the processing performed in the remote units that each remote unit supports.

Example 7 includes the system of any of Examples 1-6, wherein the system is configured to, for each said at least one functional split and each remote unit associated with that functional split, configure the processing performed in the baseband controller and the processing performed in that remote unit to use that functional split by configuring Layer-1 functions in the baseband controller and Layer-1 functions in that remote unit to use that functional split.

Example 8 includes the system of Example 7, wherein one or more of the baseband controller and the remote units comprises, for each functional split between the processing performed the baseband controller and the processing performed in the remote units supported thereby, a respective separate Layer-1 signal processing chain.

Example 9 includes the system of any of Examples 7-8, wherein one or more of the baseband controller and the remote units comprises, for each wireless interface configuration supported thereby, a respective separate Layer-1 signal processing chain.

Example 10 includes the system of any of Examples 7-9, wherein at least one of the baseband controller or the remote units comprises a configurable Layer-1 signal processing chain having multiple stages; and wherein the processing performed in said at least one of the baseband controller or the remote units is configured to use the respective functional split by omitting one or more stages of the configurable Layer-1 processing chain.

Example 11 includes the system of any of Examples 1-10, wherein the system is configured to provide functional split options on a per wireless-interface channel basis.

Example 12 includes the system of any of Examples 1-11, wherein the system is configured to, for each said at least one functional split and each remote unit associated with that functional split, configure the respective interface between the baseband controller and that remote unit for communicating front-haul data therebetween using that functional split by: configuring application platform functions in the baseband controller and in that remote unit to use a proprietary or standardized interface between the baseband controller and that remote unit for communicating front-haul data therebetween using that functional split.

Example 13 includes the system of any of Examples 1-12, wherein the system is configured to: determine a respective functional split in the processing performed in the baseband controller and the processing performed in the remote units for each networking slice served by the baseband controller; and for each networking slice served by the baseband controller: configure the processing performed in the baseband controller and the processing performed in the remote units serving that networking slice to use the respective functional split determined for that networking slice; and configure a respective interface between the baseband controller and the remote units serving that networking slice for communicating front-haul data therebetween using the respective functional split determined for that networking slice.

Example 14 includes the system of Example 13, wherein the baseband controller is implemented in a virtualized platform, wherein each networking slice is served by a separate instantiation of baseband controller functionality, wherein each separate instantiation independently determines the respective functional split in the processing performed in the baseband controller and the processing performed in the remote units for that networking slice, configure the processing performed in the baseband controller and the processing performed in the remote units serving that networking slice to use the respective functional split determined for that networking slice, and configure the respective interface between the baseband controller and the remote units serving that networking slice for communicating front-haul data therebetween using the functional split determined for that networking slice.

Example 15 includes the system of any of Examples 1-14, wherein the system is configured to: determine a respective functional split in the processing performed in the baseband controller and the processing performed in the remote units for each remote unit served by the baseband controller; and for each remote unit served by the baseband controller: configure the processing performed in the baseband controller and the processing performed in that remote unit to use the respective functional split determined for that remote unit; and configure a respective interface between the baseband controller and that remote unit for communicating front-haul data therebetween using the respective functional split determined for that remote unit.

Example 16 includes the system of any of Examples 1-15, wherein at least one of the baseband controller, a management system, and one of the remote units is configured to: determine what functional splits between the processing performed in the baseband controller and the processing performed in the remote units that each remote unit supports; determine at least one functional split in the processing performed in the baseband controller and the processing performed in the remote units to use; and for each said at least one functional split and each remote unit associated with that functional split: configure the processing performed in the baseband controller and the processing performed in that remote unit to use that functional split; and configure said respective interface between the baseband controller and that remote unit for communicating front-haul data therebetween using that functional split.

Example 17 includes a method for use with a system comprising a baseband controller communicatively coupled to a core network and a plurality of remote units, the remote units configured to wirelessly transmit and receive radio frequency signals to and from user equipment using a wireless interface, each of the remote units associated with at least one antenna and located remote from the controller, the method comprising: determining what functional splits between processing performed in the baseband controller and processing performed in the remote units that each remote unit supports; determining at least one functional split in the processing performed in the baseband controller and the processing performed in the remote units to use; and for each said at least one functional split and each remote unit associated with that functional split: configuring the processing performed in the baseband controller and the processing performed in that remote unit to use that functional split; and configuring a respective interface between the baseband controller and that remote unit for communicating front-haul data therebetween using that functional split.

Example 18 includes the method of Example 17, wherein the baseband controller is partitioned into a Central Unit and a Distributed Unit.

Example 19 includes the method of any of Examples 17-18, wherein determining what functional splits between the processing performed in the baseband controller and the processing performed in the remote units that each remote unit supports comprises at least one of: using a discovery protocol; and explicitly configuring the system with information identifying what functional splits between the processing performed in the baseband controller and the processing performed in the remote units that each remote unit supports.

Example 20 includes the method of Example 19, wherein the discovery protocol comprises at least one of: a discovery protocol used to home the remote units to the baseband controller; and a dedicated discovery protocol used only to determine what functional splits between the processing performed in the baseband controller and the processing performed in the remote units that each remote unit supports.

Example 21 includes the method of any of Examples 19-20, wherein the system is explicitly configured with information identifying what functional splits between the processing performed in the baseband controller and the processing performed in the remote units that each remote unit supports using a management system.

Example 22 includes the method of any of Examples 19-21, wherein the information identifying what functional splits between the processing performed in the baseband controller and the processing performed in the remote units that each remote unit supports is, at least one of: included in a list identifying each remote unit assigned to a cell served by the baseband controller; and a look-up table that includes information about functional splits various makes and models of remote unit support, wherein the makes and models of the plurality of remote units are used to determine what functional splits between the processing performed in the baseband controller and the processing performed in the remote units that each remote unit supports.

Example 23 includes the method of any of Examples 17-22, wherein, for each said at least one functional split and each remote unit associated with that functional split, configuring the processing performed in the baseband controller and the processing performed in that remote unit to use that functional split comprises: configuring Layer-1 functions in the baseband controller and Layer-1 functions in that remote unit to use that functional split.

Example 24 includes the method of Example 23, wherein one or more of the baseband controller and the remote units comprises, for each functional split between the processing performed the baseband controller and the processing performed in the remote units supported thereby, a respective separate Layer-1 signal processing chain.

Example 25 includes the method of any of Examples 23-24, wherein one or more of the baseband controller and the remote units comprises, for each wireless interface configuration supported thereby, a respective separate Layer-1 signal processing chain.

Example 26 includes the method of any of Examples 23-25, wherein at least one of the baseband controller or the remote units comprises a configurable Layer-1 signal processing chain having multiple stages; and wherein the processing performed in said at least one of the baseband controller or the remote units is configured to use the respective functional split by omitting one or more stages of the configurable Layer-1 processing chain.

Example 27 includes the method of any of Examples 17-26, wherein the system is configured to provide functional split options on a per wireless-interface channel basis.

Example 28 includes the method of any of Examples 17-27, wherein, for each said at least one functional split and each remote unit associated with that functional split, configuring the respective interface between the baseband controller and that remote unit for communicating front-haul data therebetween using that functional split comprises: configuring application platform functions in the baseband controller and in that remote unit to use a proprietary or standardized interface between the baseband controller and that remote unit for communicating front-haul data therebetween using that functional split using that functional split.

Example 29 includes the method of any of Examples 17-28, wherein determining at least one functional split in the processing performed in the baseband controller and the processing performed in the remote units to use comprises: determining a respective functional split in the processing performed in the baseband controller and the processing performed in the remote units for each networking slice served by the baseband controller; wherein, for each said at least one functional split and each remote unit associated with that functional split, configuring the processing performed in the baseband controller and the processing performed in that remote unit to use that functional split comprises: for each networking slice served by the baseband controller, configuring the processing performed in the baseband controller and the processing performed in the remote units serving that networking slice to use the respective functional split determined for that networking slice; and wherein, for each said at least one functional split and each remote unit associated with that functional split, configuring a respective interface between the baseband controller and that remote unit for communicating front-haul data therebetween using that functional split comprises: for each networking slice served by the baseband controller, configuring a respective interface between the baseband controller and the remote units serving that networking slice for communicating front-haul data therebetween using the respective functional split determined for that networking slice.

Example 30 includes the method of Example 29, wherein the baseband controller is implemented in a virtualized platform, wherein each networking slice is served by a separate instantiation of baseband controller functionality, wherein each separate instantiation independently determines the respective functional split in the processing performed in the baseband controller and the processing performed in the remote units for that networking slice, configure the processing performed in the baseband controller and the processing performed in the remote units serving that networking slice to use the respective functional split determined for that networking slice, and configure the respective interface between the baseband controller and the remote units serving that networking slice for communicating front-haul data therebetween using the respective functional split determined for that networking slice.

Example 31 includes the method of any of Examples 17-30, wherein determining at least one functional split in the processing performed in the baseband controller and the processing performed in the remote units to use comprises: for each remote unit served by the baseband controller, determining a respective functional split in the processing performed in the baseband controller and the processing performed in that remote units for that remote unit; and wherein, for each said at least one functional split, configuring the processing performed in the baseband controller and the processing performed in the remote units associated with that functional split to use that functional split comprises: for each remote unit served by the baseband controller, configuring the processing performed in the baseband controller and the processing performed in that remote unit to use the respective functional split determined for that remote unit; and wherein, for each said at least one functional split, configuring a respective interface between the baseband controller and the remote units associated with that functional split for communicating front-haul data therebetween using that functional split comprises: for each remote unit served by the baseband controller, configuring a respective interface between the baseband controller and that remote unit for communicating front-haul data therebetween using the respective functional split determined for that remote unit.

Example 32 includes the method of any of Examples 17-31, wherein at least one of the baseband controller, a management system, and one of the remote units is configured to perform the method.

What is claimed is:
1. A system comprising:
a baseband controller to communicatively couple the system to a core network; and
first remote unit, communicatively coupled to the baseband controller, to wirelessly transmit and receive radio frequency signals to and from user equipment using a wireless interface, the first remote unit associated with at least one antenna and located remote from the baseband controller;
wherein the system is configured to:
determine what functional splits between processing performed in the baseband controller and processing performed in the first remote unit that the first remote unit supports;
determine at least one functional split in the processing performed in the baseband controller and the processing performed in the first remote unit to use; and
for at least a first functional split of the at least one functional split and the first remote unit associated with the first functional split:
configure the processing performed in the baseband controller and the processing performed in the first remote unit associated with the first functional split to use the first functional split; and
configure a respective interface between the baseband controller and the first remote unit associated with the first functional split for communicating front-haul data therebetween using the first functional split.

2. The system of claim 1, wherein the baseband controller is partitioned into a Central Unit and a Distributed Unit.

3. The system of claim 1, wherein the system is configured to determine what functional splits between the processing performed in the baseband controller and the processing performed in the first remote unit that the first remote unit supports by doing at least one of:
using a discovery protocol; and
explicitly configuring the system with information identifying what functional splits between the processing performed in the baseband controller and the processing performed in the first remote unit supports.

4. The system of claim 3, wherein the discovery protocol comprises at least one of:
a discovery protocol used to home the first remote unit to the baseband controller; and
a dedicated discovery protocol used only to determine what functional splits between the processing performed in the baseband controller and the processing performed in the first remote unit that the first remote unit supports.

5. The system of claim 3, wherein the system is explicitly configured with information identifying what functional splits between the processing performed in the baseband controller and the processing performed in the first remote unit that the first remote unit supports using a management system.

6. The system of claim 3, wherein the information identifying what functional splits between the processing performed in the baseband controller and the processing performed in the first remote unit that the first remote unit supports is, at least one of:
included in a list identifying each remote unit assigned to a cell served by the baseband controller; and
a look-up table that includes information about functional splits various makes and models of the first remote unit support, wherein the makes and models of the first remote unit are used to determine what functional splits between the processing performed in the baseband controller and the processing performed in the first remote unit that the first remote unit.

7. The system of claim 1, wherein the system is configured to, for at least the first functional split and the first remote unit associated with the first functional split, configure the processing performed in the baseband controller and the processing performed in the first remote unit associated with the first functional split to use the first functional split by configuring Layer-1 functions in the baseband controller and Layer-1 functions in the first remote unit associated with the first functional split to use the first functional split.

8. The system of claim 7, wherein one or more of the baseband controller and the first remote unit comprises, for each functional split between the processing performed in the baseband controller and the processing performed in the first remote unit supported thereby, a respective separate Layer-1 signal processing chain.

9. The system of claim 7, wherein the baseband controller, the first remote unit, or the baseband controller and the first remote unit, comprises, for each wireless interface configuration supported thereby, a respective separate Layer-1 signal processing chain.

10. The system of claim 7, wherein the baseband controller, the first remote unit, or the baseband controller and the first remote unit, comprises a configurable Layer-1 signal processing chain having multiple stages; and wherein the processing performed in the baseband controller, the first remote unit, or the baseband controller and the first remote unit, is configured to use the first functional split by omitting one or more stages of the configurable Layer-1 signal processing chain.

11. The system of claim 1, wherein the system is configured to provide functional split options on a per wireless-interface channel basis.

12. The system of claim 1, wherein the system is configured to, for at least the first functional split and the first remote unit associated with the first functional split, configure the respective interface between the baseband controller and the first remote unit associated with the first functional split for communicating front-haul data therebetween using the first functional split by:

configuring application platform functions in the baseband controller and in the first remote unit associated with the first functional split to use a proprietary or standardized interface between the baseband controller and the first remote unit for communicating front-haul data therebetween using the first functional split.

13. The system of claim 1, wherein the system includes a plurality of remote units, wherein the first remote unit is included in the plurality of remote units, wherein the system is configured to:

determine a respective functional split in the processing performed in the baseband controller and the processing performed in the plurality of remote units for different respective networking slices served by the baseband controller; and for each of the different respective networking slices served by the baseband controller:

configure the processing performed in the baseband controller and the processing performed in the plurality of remote units serving a respective networking slice to use the respective functional split determined for the respective networking slice; and configure a respective interface between the baseband controller and the plurality of remote units serving the respective networking slice for communicating front-haul data therebetween using the respective functional split determined for the respective networking slice.

14. The system of claim 13, wherein the baseband controller is implemented in a virtualized platform, wherein each of the different respective networking slices is served by a separate instantiation of baseband controller functionality, wherein each separate instantiation independently determines the respective functional split in the processing performed in the baseband controller and the processing performed in the plurality of remote units for the respective networking slice, configure the processing performed in the baseband controller and the processing performed in the plurality of remote units serving the respective networking slice to use the respective functional split determined for the respective networking slice, and configure the respective interface between the baseband controller and the plurality of remote units serving the respective networking slice for communicating front-haul data therebetween using the respective functional split determined for the respective networking slice.

15. The system of claim 1, wherein the system includes a plurality of remote units, wherein the first remote unit is included in the plurality of remote units, wherein the system is configured to:

determine a respective functional split in the processing performed in the baseband controller and the processing performed in the plurality of remote units for each remote unit of the plurality of remote units served by the baseband controller; and for each respective remote unit of the plurality of remote units served by the baseband controller:

configure the processing performed in the baseband controller and the processing performed in a respective remote unit of the plurality of remote units to use the respective functional split determined for the respective remote unit of the plurality of remote units; and configure a respective interface between the baseband controller and the respective remote unit of the plurality of remote units for communicating front-haul data therebetween using the respective functional split determined for the respective remote unit of the plurality of remote units.

16. The system of claim 1, wherein at least one of the baseband controller, a management system, and the first remote unit is configured to:

determine what functional splits between the processing performed in the baseband controller and the processing performed in the first remote unit that the first remote unit supports;

determine at least one functional split in the processing performed in the baseband controller and the processing performed in the first remote unit to use; and for at least the first functional split and first remote unit associated with the first functional split:

configure the processing performed in the baseband controller and the processing performed in the first remote unit to use the first functional split; and configure said respective interface between the baseband controller and the first remote unit for communicating front-haul data therebetween using the first functional split.

17. The system of claim 1, wherein the system comprises a plurality of remote units, wherein the first remote unit is included in the plurality of remote units, wherein the system is configured to:
 determine what functional splits between processing performed in the baseband controller and processing performed in the plurality of remote units that each remote unit of the plurality of remote units supports;
 determine at least one functional split in the processing performed in the baseband controller and the processing performed in the plurality of remote units to use; and
 for at least a first functional split of the at least one functional split and each remote unit of the plurality of remote units associated with the first functional split:
  configure the processing performed in the baseband controller and the processing performed in each remote unit of the plurality of remote units associated with the first functional split to use the first functional split and
  configure a respective interface between the baseband controller and each remote unit of the plurality of remote units associated with the first functional split for communicating front-haul data therebetween using the first functional split.

18. A method for use with a system comprising a baseband controller communicatively coupled to a core network and a first remote unit, the first remote unit configured to wirelessly transmit and receive radio frequency signals to and from user equipment using a wireless interface, first remote unit associated with at least one antenna and located remote from the baseband controller, the method comprising:
 determining what functional splits between processing performed in the baseband controller and processing performed in the first remote unit that the first remote unit supports;
 determining at least one functional split in the processing performed in the baseband controller and the processing performed in the first remote unit to use; and
 for at least a first functional split of the at least one functional split and the first remote unit associated with the first functional split:
  configuring the processing performed in the baseband controller and the processing performed in the first remote unit associated with the first functional split to use the first functional split; and
  configuring a respective interface between the baseband controller and the first remote unit associated with the first functional split for communicating front-haul data therebetween using the first functional split.

19. The method of claim 18, wherein the baseband controller is partitioned into a Central Unit and a Distributed Unit.

20. The method of claim 18, wherein determining what functional splits between the processing performed in the baseband controller and the processing performed in the first remote unit that the first remote unit supports comprises at least one of:
 using a discovery protocol; and
 explicitly configuring the system with information identifying what functional splits between the processing performed in the baseband controller and the processing performed in the first remote unit that the first remote unit supports.

21. The method of claim 20, wherein the discovery protocol comprises at least one of:
 a discovery protocol used to home the first remote unit to the baseband controller; and
 a dedicated discovery protocol used only to determine what functional splits between the processing performed in the baseband controller and the processing performed in the first remote unit that the first remote unit supports.

22. The method of claim 20, wherein the system is explicitly configured with information identifying what functional splits between the processing performed in the baseband controller and the processing performed in the first remote unit that the first remote unit supports using a management system.

23. The method of claim 20, wherein the information identifying what functional splits between the processing performed in the baseband controller and the processing performed in the first remote unit that the first remote unit supports is, at least one of:
 included in a list identifying the first remote unit assigned to a cell served by the baseband controller; and
 a look-up table that includes information about functional splits various makes and models of the first remote unit support, wherein the makes and models of the first remote unit are used to determine what functional splits between the processing performed in the baseband controller and the processing performed in the first remote unit that the first remote unit supports.

24. The method of claim 18, wherein, for at least the first functional split and the first remote unit associated with the first functional split, configuring the processing performed in the baseband controller and the processing performed in the first remote unit associated with the first functional split to use the first functional split comprises:
 configuring Layer-1 functions in the baseband controller and Layer-1 functions in the first remote unit associated with the first functional split to use the first functional split.

25. The method of claim 24, wherein one or more of the baseband controller and the first remote unit comprises, for each functional split between the processing performed the baseband controller and the processing performed in the first remote unit supported thereby, a respective separate Layer-1 signal processing chain.

26. The method of claim 24, wherein one or more of the baseband controller and the first remote unit comprises, for each wireless interface configuration supported thereby, a respective separate Layer-1 signal processing chain.

27. The method of claim 24, wherein at least one of the baseband controller or the first remote unit comprises a configurable Layer-1 signal processing chain having multiple stages; and
 wherein the processing performed in said at least one of the baseband controller or the first remote unit is configured to use the first functional split by omitting one or more stages of the configurable Layer-1 signal processing chain.

28. The method of claim 18, wherein the system is configured to provide functional split options on a per wireless-interface channel basis.

29. The method of claim 18, wherein, for at least one the first functional split and the first remote unit associated with the first functional split, configuring the respective interface between the baseband controller and the first remote unit associated with the first functional split for communicating front-haul data therebetween using the first functional split comprises:

configuring application platform functions in the baseband controller and in the first remote unit associated with the first functional split to use a proprietary or standardized interface between the baseband controller and the first remote unit associated with the first functional split for communicating front-haul data therebetween using the first functional split.

30. The method of claim 18, wherein the system includes a plurality of remote units, wherein the first remote unit is included in the plurality of remote units, the method further comprising:
  determining a respective functional split in the processing performed in the baseband controller and the processing performed in the plurality of remote units for different respective networking slices served by the baseband controller;
  wherein, for at least the first functional split and each remote unit of the plurality of remote units associated with the first functional split, configuring the processing performed in the baseband controller and the processing performed in each remote unit of the plurality of remote units associated with the first functional split to use the first functional split comprises:
  for each of the different respective networking slices served by the baseband controller, configuring the processing performed in the baseband controller and the processing performed in the plurality of remote units serving a respective networking slice to use the respective functional split determined for the respective networking slice; and
  wherein, for at least the first functional split and each remote unit of the plurality of remote units associated with the first functional split, configuring a respective interface between the baseband controller and each remote unit of the plurality of remote units associated with the first functional split for communicating front-haul data therebetween using the first functional split comprises:
  for each networking slice served by the baseband controller, configuring a respective interface between the baseband controller and the plurality of remote units serving the respective networking slice for communicating front-haul data therebetween using the respective functional split determined for the respective networking slice.

31. The method of claim 30, wherein the baseband controller is implemented in a virtualized platform, wherein each networking slice is served by a separate instantiation of baseband controller functionality, wherein each separate instantiation independently determines the respective functional split in the processing performed in the baseband controller and the processing performed in the plurality of remote units for the respective networking slice, configure the processing performed in the baseband controller and the processing performed in the plurality of remote units serving the respective networking slice to use the respective functional split determined for the respective networking slice, and configure the respective interface between the baseband controller and the plurality of remote units serving the respective networking slice for communicating front-haul data therebetween using the respective functional split determined for the respective networking slice.

32. The method of claim 18, wherein the system includes a plurality of remote units, wherein the first remote unit is included in the plurality of remote units, the method further comprising:
  for each respective remote unit of the plurality of remote units served by the baseband controller, determining a respective functional split in the processing performed in the baseband controller and the processing performed in the respective remote unit of the plurality of remote units for the respective remote unit of the plurality of remote units; and
  wherein, for at least the first functional split, configuring the processing performed in the baseband controller and the processing performed in the plurality of remote units associated with the first functional split to use the first functional split comprises:
  for each respective remote unit served by the baseband controller, configuring the processing performed in the baseband controller and the processing performed in the respective remote unit of the plurality of remote units to use the respective functional split determined for the respective remote unit of the plurality of remote units; and
  wherein, for at least the first functional split, configuring a respective interface between the baseband controller and the plurality of remote units associated with the first functional split for communicating front-haul data therebetween using the first functional split comprises:
  for each respective remote unit of the plurality of remote units served by the baseband controller, configuring a respective interface between the baseband controller and the respective remote unit of the plurality of remote units for communicating front-haul data therebetween using the respective functional split determined for the respective remote unit of the plurality of remote units.

33. The method of claim 18, wherein at least one of the baseband controller, a management system, and the first remote unit is configured to perform the method.

34. The method of claim 18, wherein the system comprises a plurality of remote units, wherein the first remote unit is included in the plurality of remote units, the method comprising:
  determining what functional splits between processing performed in the baseband controller and processing performed in the plurality of remote units that each remote unit of the plurality of remote units supports;
  determining at least one functional split in the processing performed in the baseband controller and the processing performed in the plurality of remote units to use; and
  for at least a first functional split of the at least one functional split and each remote unit associated with the first functional split:
  configuring the processing performed in the baseband controller and the processing performed in each remote unit associated with the first functional split to use the first functional split and
  configuring a respective interface between the baseband controller and each remote unit of the plurality of remote units associated with the first functional split for communicating front-haul data therebetween using the first functional split.

* * * * *